(12) United States Patent
Schmogrow et al.

(10) Patent No.: US 10,771,180 B1
(45) Date of Patent: Sep. 8, 2020

(54) GREEN REGENERATIVE ENERGY EFFICIENT NETWORK

(71) Applicant: Google LLC, Mountain View, CA (US)

(72) Inventors: Rene Schmogrow, San Jose, CA (US);
Mattia Cantono, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/458,355

(22) Filed: Jul. 1, 2019

(51) Int. Cl.
*H04J 14/02* (2006.01)
*H04Q 11/00* (2006.01)

(52) U.S. Cl.
CPC ...... *H04J 14/0212* (2013.01); *H04J 14/0227* (2013.01); *H04Q 11/0005* (2013.01); *H04Q 2011/0013* (2013.01); *H04Q 2011/0016* (2013.01); *H04Q 2011/0039* (2013.01); *H04Q 2011/0052* (2013.01)

(58) Field of Classification Search
CPC .............. H04J 14/0212; H04J 14/0227; H04Q 11/0005; H04Q 2011/0013; H04Q 2011/0016; H04Q 2011/0039; H04Q 2011/0052
USPC ....................................................... 398/49
See application file for complete search history.

(56) References Cited

U.S. PATENT DOCUMENTS

| | | | | |
|---|---|---|---|---|
| 9,071,364 | B1 * | 6/2015 | Voois ................. | H04B 10/2507 |
| 2002/0159117 | A1 * | 10/2002 | Nakajima ........... | H04J 14/0212 |
| | | | | 398/83 |
| 2009/0232497 | A1 * | 9/2009 | Archambault ...... | H04J 14/0206 |
| | | | | 398/50 |
| 2014/0126904 | A1 * | 5/2014 | Testa .................. | H04J 14/0212 |
| | | | | 398/48 |
| 2015/0333824 | A1 * | 11/2015 | Swinkels ............ | H04J 14/0257 |
| | | | | 398/25 |
| 2016/0173964 | A1 * | 6/2016 | Weldon .................. | H04J 14/02 |
| | | | | 398/48 |
| 2016/0269809 | A1 * | 9/2016 | Jiang .................. | H04Q 11/0005 |
| 2017/0104632 | A1 * | 4/2017 | Kim .................... | H04L 41/0826 |
| 2018/0212838 | A1 * | 7/2018 | Litvin .................... | H04L 43/10 |

(Continued)

OTHER PUBLICATIONS

Devarajan, A. et al. "Colorless, Directionless and Contentionless multi-degree ROADM architecture for mesh optical networks." Feb. 2010. 2010 Second International Conference on COMmunication Systems and NETworks (Comsnets 2010). 11 pages. Retrieved from the Internet: <https://www.researchgate.net/publication/224124873>.

(Continued)

*Primary Examiner* — Dalzid E Singh
(74) *Attorney, Agent, or Firm* — Lerner, David, Littenberg, Krumholz & Mentlik, LLP

(57) ABSTRACT

A network is provided with a plurality of nodes connected to one another. At least one node of the plurality of nodes include one or more transponders. For example, the transponders may be configured to receive optical signals having a first set of wavelengths at a first degree of a plurality of degrees in the at least one node. The transponders may convert the received optical signals into electrical signals, and then regenerate optical signals by generating, based on the electrical signals, optical signals having a second set of wavelengths. The node may further include one or more switches configured to route the regenerated optical signals to one or more of the plurality of degrees of the at least one node.

32 Claims, 15 Drawing Sheets

(56) References Cited

U.S. PATENT DOCUMENTS

2019/0349111 A1* 11/2019 Solheim ............ H01S 3/094003

OTHER PUBLICATIONS

Magalhães, E. C. et al. "Node Architectures for Next Generation ROADMs: A comparative study among emergent optical solutions." Jul. 2013. Journal of Microwaves, Optoelectronics and Electromagnetic Applications, vol. 12, No. S1-2. pp. 156-166. Retrieved from the Internet: <https://www.researchgate.net/publication/257362979>.

Marom, D. M. et al. "Survey of Photonic Switching Architectures and Technologies in Support of Spatially and Spectrally Flexible Optical Networking [Invited]." Jan. 2017. Optical Society of America. J. Opt. Commun. Netw. vol. 9, No. 1. pp. 1-26.

Perrin, S. "Next-Generation ROADM Architectures & Benefits." White Paper. Heavy Reading. Mar. 2015. 10 pages.

Theodoras, J. "A Primer on ROADM Architectures." ADVA Optical Networking. Aug. 2012. 17 pages.

* cited by examiner

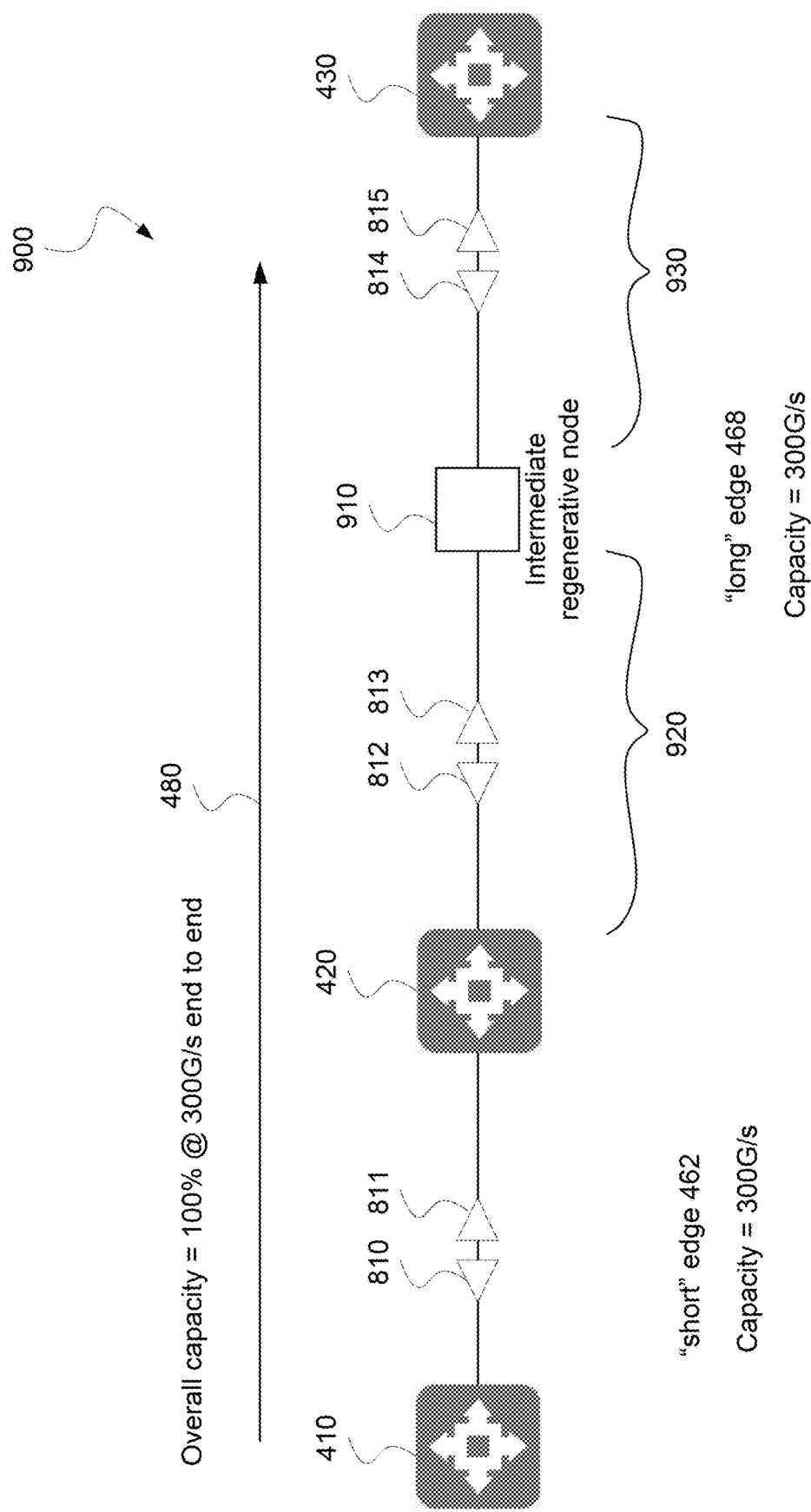

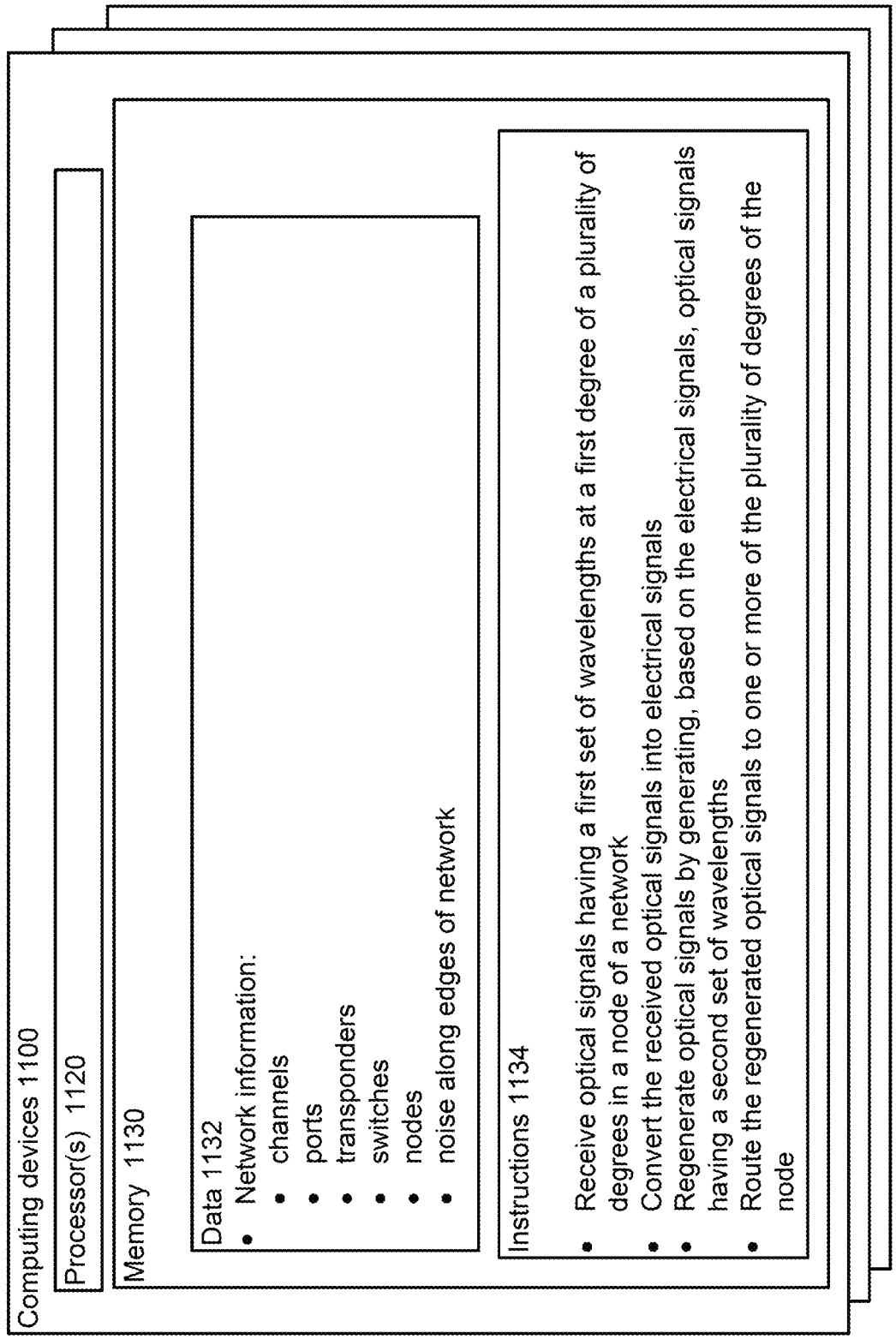

GREEN REGENERATIVE ENERGY EFFICIENT NETWORK

BACKGROUND

FIG. 1 shows an example mesh optical network with a number of interconnected nodes. Nodes in the mesh optical network may be configured to be colorless (can receive and/or transmit signals of multiple wavelengths), directionless (can direct signals in multiple directions), and contentionless (can receive and/or transmit multiple signals with the same wavelength within the same node). As shown, a colorless, directionless, and contentionless ("CDC") network is often implemented with one or more reconfigurable optical add and drop multiplexer ("ROADM") nodes. Although not shown, a colorless and directionless ("CD") network may have similar building blocks as a CDC network, but with different add/drop structures. As such, the terms CD network and CDC network (also CD node and CDC node) may be used interchangeably in the descriptions below. A ROADM node may be configured to optically route optical signals to other nodes in the network ("express transit") in multiple directions ("express paths" or "edges"), as well as to convert the optical signals into electrical signals for transmission to local routers ("locally terminate" or "add/drop"). As the number of nodes and the number of edges increases, for example with the addition of new infrastructure and new channels of communication, the mesh optical network becomes "meshier."

Although nodes in a traditional CDC network may be contentionless, contentions may still occur along edges between the nodes. For example as shown in FIG. 1, transponder A of Node 1 may be configured to transmit an optical signal of wavelength α to Node 2 (channel A), while transponder B of Node 1 may also be configured to transmit an optical signal of wavelength α to Node 3 (channel B). As such, optical signals from transponders A and B may need to share a same edge between Node 1 and Node 2 along their respective express paths, resulting in a contention along the shared edge. Although the optical signal for one of the contentious channels, such as channel A, can still be transmitted via a different express path using other edges (e.g., dotted lines through Node 5), that express path may not be the most efficient express path in the network.

FIG. 2 shows an example ROADM node in a traditional CDC network. As shown, the ROADM node has three "degrees," labeled as "ROADM West," "ROADM East," and "ROADM North," each of which may receive incoming signals from and/or transmit outgoing signals to other nodes of the network. The ROADM node may include a number of optical and/or electrical components, such as transponders, multiplexers, demultiplexers, switches, amplifiers, etc. For example, high performance data center interconnect ("DCI") transponders may be configured to perform optical to electrical conversions with relatively high spectral efficiency on the optical line. Complex add/drop structures ("MUX+DeMUX") may allow transmissions within the node to be CDC. The ROADM node may be configured to maximize optical routing (without converting to or from electrical signals), such as shown for routing signals between all degrees of the node, and to minimize optical to electrical conversions, such as shown only for local add/drop. As mentioned above, a node in the CD network may have similar components, but with different add/drop structures as those shown in FIG. 2.

FIG. 3 shows example asymmetrical edges connecting nodes along an express path in a traditional CDC network. The asymmetry may be a result of practical constraints, such as available locations where the infrastructure can be built. As shown, some edges, such as the relatively longer edge between Node 1 and Node 2, may require more amplifiers than other edges, such as the relatively shorter edge between Node 2 and Node 3. Since each amplifier adds noise to the optical signals, overall optical noise along an express path is a sum of optical noise accumulated along all edges within the express path. As such, the accumulated noise lowers the spectral efficiency (bit/s/Hz) of data transmission along the express path. Or in other words, the achievable capacity (bit/s) of an optical signal in a fixed frequency or wavelength along an express path is lowered by the accumulated noise. Further, wavelength contentions along edges as described above may further reduce overall spectral efficiency and achievable capacity for data transmission along the express path between Node 1 and Node 3.

BRIEF SUMMARY

The present disclosure provides for a system comprising one or more transponders and one or more first switches. The one or more transponders may be configured to receive optical signals having a first set of wavelengths at a first degree of a plurality of degrees in a node of a network; convert the received optical signals into electrical signals; and regenerate optical signals by generating, based on the electrical signals, optical signals having a second set of wavelengths. The one or more first switches may be configured to route the regenerated optical signals to one or more of the plurality of degrees of the node.

The one or more first switches may include one or more wavelength selective switches (WSS) configured to route the received optical signals to a plurality of ports each configured for receiving one or more wavelengths of the first set of wavelengths.

The one or more first switches may include one or more wavelength selective switches (WSS) configured to route the regenerated optical signals to another node of the network.

The one or more first switches may include one or more arrayed waveguide gratings (AWG) configured to route the received optical signals to a plurality of ports each configured for receiving one or more wavelengths of the first set of wavelengths.

The system may further comprise one or more second switches configured to route a first portion of the received optical signals to a local termination; and route a second portion of the received optical signals to an express transit.

The system may further comprise one or more routers connected to the local termination.

The system may further comprise one or more data center interconnect (DCI) transponders configured to convert the first portion of the received optical signals in the local termination into electrical signals; and route the electrical signals in the local termination to one or more routers.

The system may further comprise a plurality of ports configured to transport electrical signals in the local termination at a respective plurality of transmission speeds.

At least one of the one or more transponders may be a ZR transponder.

The present disclosure further provides for a network comprising a plurality of nodes connected to one another. At least one of the plurality of nodes comprises one or more transponders and one or more switches. The one or more transponders may be configured to receive optical signals having a first set of wavelengths at a first degree of a plurality of degrees in a node of a network; convert the received optical signals into electrical signals; and regenerate optical signals by generating, based on the electrical signals, optical signals having a second set of wavelengths. The one or more switches may be configured to route the regenerated optical signals to one or more of the plurality of degrees of the node.

A first node in the network may have a first edge connecting to a second node of the network and a second edge connected to a third node of the network, wherein the first edge has a first spectral efficiency and the second edge has a second spectral efficiency, the first spectral efficiency being higher than the second spectral efficiency.

The first node may be configured to transmit optical signals through the first edge at the second spectral efficiency.

The network may further comprise an intermediate regenerative node. The intermediate regenerative node may be configured to convert the optical signals from the first node into electrical signals; regenerate, based on the electrical signals, new optical signals; and route the new optical signals to the third node. The intermediate regenerative node may be positioned along the second edge between the first node and the third node such that a difference between the first spectral efficiency and the second spectral efficiency decreases.

The first node may be further configured to convert a received optical signal of a first capacity into a first electrical signal; split the first electrical signal into a plurality of electrical signals each having a capacity smaller than the first capacity; regenerate optical signals by converting each of the plurality of electrical signals into a new optical signal to be transmitted through the second edge.

The second node and the third node may be configured to communicate with each other through optical signals of a first wavelength along the first edge and optical signals of a second wavelength along the second edge, wherein the optical signals are converted from the first wavelength to the second wavelength at the first node.

The present disclosure still further provides for receiving optical signals having a first set of wavelengths at a first degree of a plurality of degrees in a node of a network; converting the received optical signals into electrical signals; regenerating optical signals by generating, based on the electrical signals, optical signals having a second set of wavelengths; and routing the regenerated optical signals to one or more of the plurality of degrees of the node.

The method may further comprise routing the received optical signals to a plurality of ports each configured for receiving one or more wavelengths of the first set of wavelengths.

The method may further comprise routing a first portion of the received optical signals to a local termination; and routing a second portion of the received optical signals to an express transit.

The method may further comprise converting the first portion of the received optical signals in the local termination into electrical signals; and routing the electrical signals in the local termination through a router.

The optical signals having the second set of wavelengths may be regenerated using the second portion of the received optical signals in the express transit.

BRIEF DESCRIPTION OF THE DRAWINGS

FIG. 9A shows symmetrical edges with an intermediate regenerative node in accordance with aspects of the disclosure.

FIG. 11 shows an example block diagram of a node in a regenerative optical network in accordance with aspects of the disclosure.

DETAILED DESCRIPTION

Overview

Figure 1:
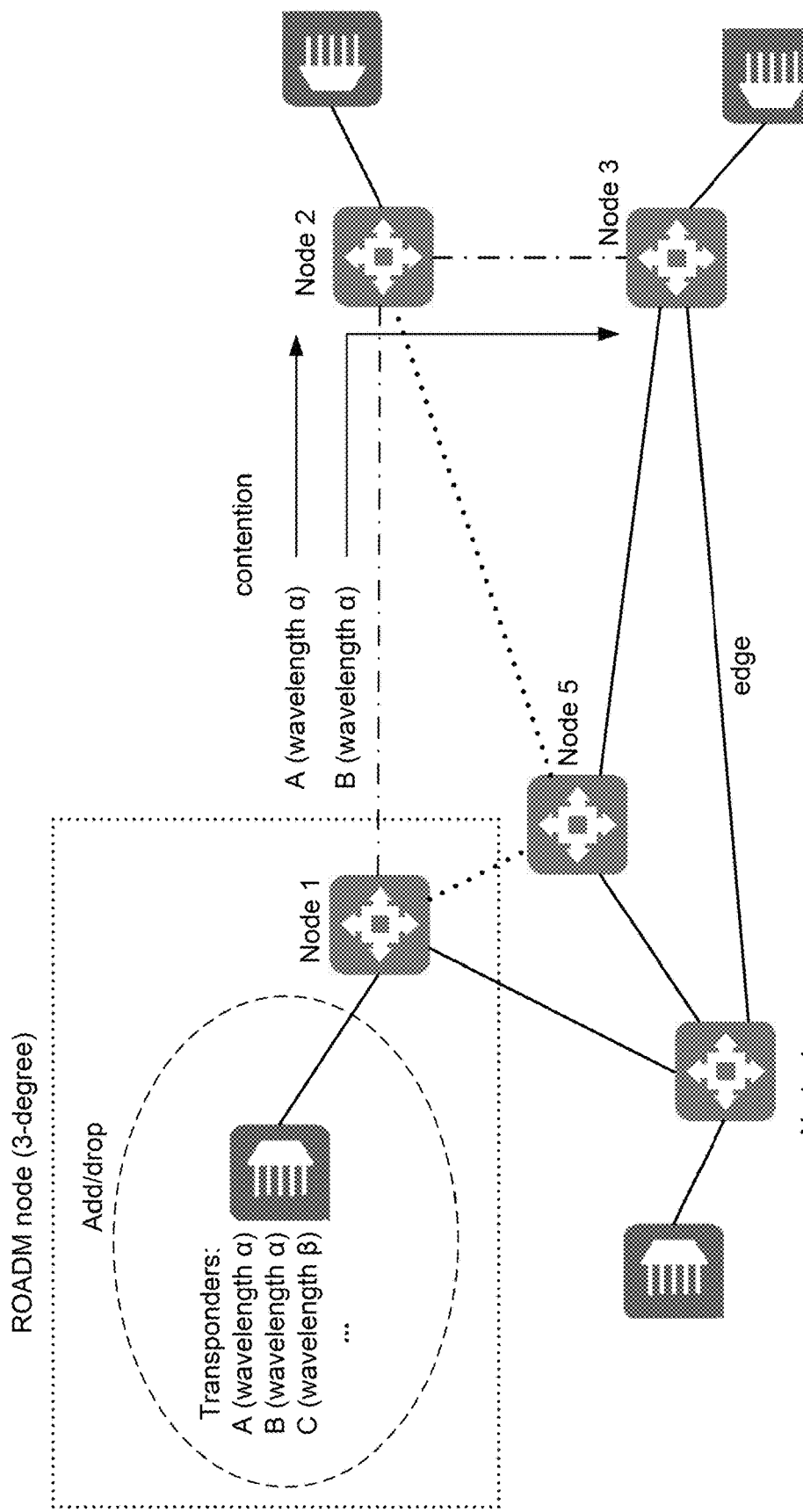
FIG. 1 shows an example traditional CDC network in accordance with the prior art.

The technology relates generally to a regenerative optical network. As described above and illustrated by FIG. 1, contentions may occur along edges of a traditional CDC network. As the number of nodes in the network increases and the required number of edges with contiguous available spectrum between two nodes increases, some of the nodes may be completely blocked from reaching each other, or at least temporarily until the optical signals traversing those edges are reconfigured for a different wavelength. Further, routing design for optical channels in a network without taking into account future channel additions may result in a fragmented network, yet it may be difficult or even impossible to predict future channel additions. A fragmented network may result in more blocked edges, which reduces maximum utilization of the network. For example, an upper limit for a traditional CDC network may be 80% or lower, which is at least partially a result of blocked edges. Moreover, since noise accumulates as an optical signal propagates along each edge, as the number of required edges increases, the amount of noise in the optical signal may also increase. In addition, high performance components such as DCI transponders and complex add/drop structures shown in FIG. 2 may be expensive and consume a lot of energy. Still further, overall achievable spectral efficiency is lowered in a traditional CDC network since an optical signal traverses all edges along an express path without optical to electrical conversion, and thus noise along all the edges are accumulated in the routed optical signal.

To address these issues, a regenerative optical network is provided that terminates and regenerates optical signals at nodes of the regenerative optical network. For instance, an optical signal having a first wavelength may be received at a node, once received, the optical signal may first be converted into an electrical signal, and then converted back into an optical signal having a second wavelength ("regenerated"). The regenerated optical signal with the second wavelength may then be routed along an express path to another node. Thus, by regenerating optical signals at the nodes even for express transit, the optical signals can be converted into different wavelengths to avoid contentions along edges of the regenerative optical network. As such, contiguous spectrum along multiple edges is not required in the regenerative optical network to transmit optical signals of a particular channel along an express path.

Each node of the regenerative optical network may include one or more transponders configured for optical to electrical and electrical to optical conversions. For example, the transponders may be low cost and low energy transponders, such as 400ZR or ZR+ type transponders. Optical signals received at the node may be transmitted to one or more transponders, such as two transponders coupled to each other. The first transponder may convert the received optical signals into electrical signals, then the second transponder may convert the electrical signals back into optical signals.

The regenerative optical network may also include one or more switches. For example, a switching array, such as a wavelength selective switch ("WSS") array or an arrayed waveguide grating ("AWG"), may be configured to route optical signals received from different channels through a line port to different express paths. The switching may be frequency or wavelength selective, where different wavelengths in the received optical signals may be routed from the line port to multiple local ports. As another example, one or more switches may be configured to route the received optical signals to either local add/drop or express transit. Optical signals in local add/drop may then be converted into electrical signals and transmitted to servers and/or client devices, for example via a router. In contrast, optical signals in express transit may be routed further, such as to another node of the regenerative optical network. The regenerative optical network may also include other switches configured to direct the regenerated optical signals between various degrees within the node.

In the regenerative optical network, each node may have a similar or different configuration. For example, one node in the regenerative optical network may not include any DCI or similar transponders, while another node may include a DCI or similar transponder in one or more degrees of the node. The DCI transponder may be configured to convert optical signals into electrical signals for local add/drop.

Nodes in the regenerative optical network may further include any of a number of additional components. For example, the nodes may additionally include one or more amplifiers. As another example, the local add/drop section in a node may include multiple ports such that electrical signals may first be received at a common port, and then divided into multiple ports potentially having different speeds, before being connected to a router.

In another aspect, the regenerative optical network may further include features that mitigate the effects of noise asymmetry on transmission efficiency and capacity. In one example, nodes in the regenerative optical network may be configured to transmit optical signals at a capacity that is a lowest denominator among achievable capacities of different edges along an express path. In another example, an edge with a higher achievable capacity in an express path may be split into multiple edges by one or more additional regenerative nodes. Alternatively, an optical signal along an edge carrying higher data volume may be re-groomed into multiple optical signals each carrying a lower data volume, so that remaining capacity along that edge can be used for transmitting other optical signals.

The technology is advantageous because it provides an energy and cost efficient mesh optical network. As described above, the regenerative optical network prevents network fragmentation and blocking to increase edge utilization, which in some instances may reach up to 100%. Since optical signals are regenerated at each node along an express path, noise is not accumulated along multiple edges of the express path. The regenerative optical network also provides for features that increase transmission efficiency and capacity along an express path with edges that are asymmetric with respect to noise. Further, compared to a traditional CDC network using high performance transponders, the regenerative optical network may use low energy and low cost transponders to reduce the overall power usage and infrastructure cost. For instance, even where the low cost and low power transponders may have lower performance, the lower performance may be more than compensated by reduction/elimination of edge to edge noise accumulation.

Example Systems

Figure 4:
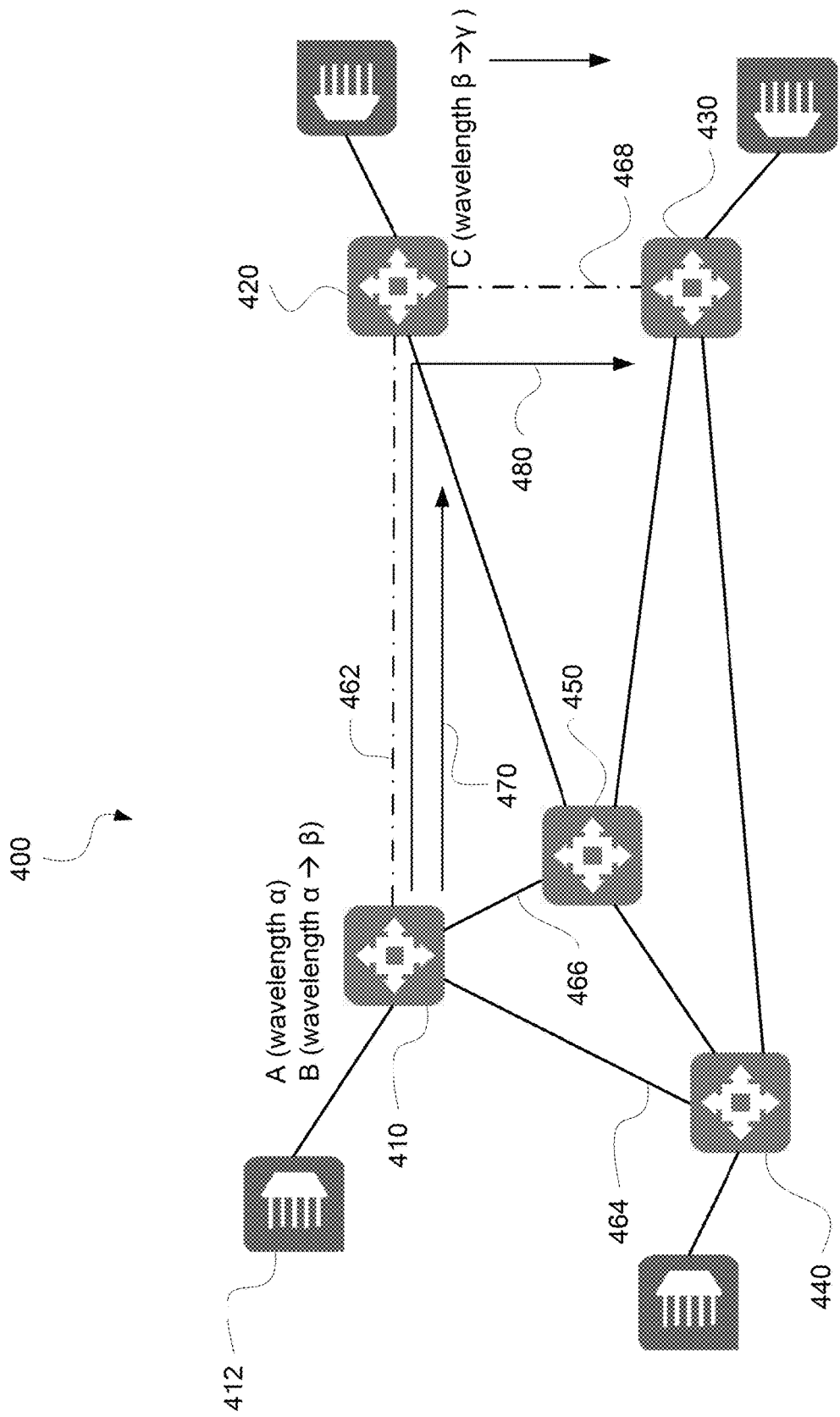
FIG. 4 shows an example regenerative optical network in accordance with aspects of the disclosure.

FIG. 4 shows an example regenerative optical network 400. The regenerative optical network 400 includes a plurality of nodes, such as nodes 410, 420, 430, 440, 450. The nodes of the regenerative optical network 400 are connected to one another through edges. For example, node 410 is connected to node 420 through edge 462, to node 440 through edge 464, and to node 450 through edge 466. The nodes of the regenerative optical network 400 may transmit optical signals to one another through express paths including one or more edges. For example, node 410 may transmit optical signals to node 420 through express path 470, which includes only edge 462, and node 410 may transmit optical signals to node 430 through express path 480, which includes edge 462 and edge 468. Thus, express path 470 and express path 480 share the edge 462.

The regenerative optical network 400 may be configured to terminate and regenerate optical signals at each node, or at least at some of the nodes. For instance, optical signals may be received at node 410, the received optical signals may be converted into electrical signals, and then converted back into optical signals before being transmitted to node 420 of the regenerative optical network 400. Thus, instead of directly routing optical signals in express transit from one node to another, the optical signals are terminated at each node by conversion into electrical signals, and then "regenerated" as optical signals at the node for further routing.

In such a regenerative optical network, contentions along edges may be reduced or eliminated. For example, a first optical signal may be added at node 410, for instance by local add/drop 412 to be transmitted along express path 470 including edge 462 and terminated at node 420. The first optical signal may be assigned a first wavelength α along edge 462 between the nodes 410 and 420, for example by configuring a first transponder A at node 410. Later, a second optical signal may be added at node 410 by local add/drop 412 to be transmitted along express path 480 including edges 462 and 468 and terminated at node 430. This second optical signal may be assigned a second wavelength β along edge 462, for example by configuring a second transponder B at node 410, since wavelength α is already occupied along edge 462 by the first optical signal. This way, a potential contention along shared edge 462 is eliminated.

Further as shown, once node 420 receives the second optical signal having the second wavelength β, node 420 will need to transmit the second optical signal to node 430. However, edge 468 may already be configured to transmit another optical signal with the second wavelength β (for example this other optical signal might have been added at another node, not shown). As such, the second optical signal need to be reconfigured to another wavelength. In this regard, the second node 420 may terminate the second optical signal with a second wavelength β, and regenerate optical signal in a third, available, wavelength, by transponder C. For example, the regenerated optical signal at node 420 may have a third, available, wavelength γ as shown, or revert back to the first wavelength α (if it is available along edge 468).

As such, the shared edge 468 of FIG. 4, unlike the shared edge of FIG. 1, is not blocked for transmitting optical signals from two transponders configured for the same wavelength. Thus, as compared to the traditional CDC network of FIG. 1, higher edge utilization is possible in the regenerative optical network 400, in some instances up to 100% (all edges are usable for transmission between any pair of transponders). In addition, transmission for a single channel along express path 480 may include transmission of optical signals having different wavelengths—second wavelength β along edge 462 and third wavelength γ along edge 468. Thus, another consequence is that contiguous spectrum along multiple edges is not required for transmission for a single channel along an express path in the regenerative optical network 400.

Also as mentioned above, by terminating the optical signal at each node, the regenerative optical network 400 prevents noise from accumulating along multiple edges along an express path. For example, an optical signal traversing through express path 480 may accumulate a certain amount of noise along edge 462, but when the optical signal and the noise is received at a node, the received optical signal is terminated and regenerated from scratch (from electrical signals), which does not include the optical noise from edge 462. The regenerated optical signal therefore does not carry the noise from edge 462 while traversing through edge 468. Thus, noise accumulation from edge to edge may be fully prevented by the regeneration.

Although only a few nodes are depicted in FIG. 4, it should be appreciated that a typical regenerative optical network can include a large number of connected nodes. Likewise, although the nodes in FIG. 4 are depicted to have a few connections, it should be appreciated that a typical node in a regenerative optical network can include a large number of connections. Further, FIG. 4 does not depict relative geographical positioning of the nodes.

Figure 5:
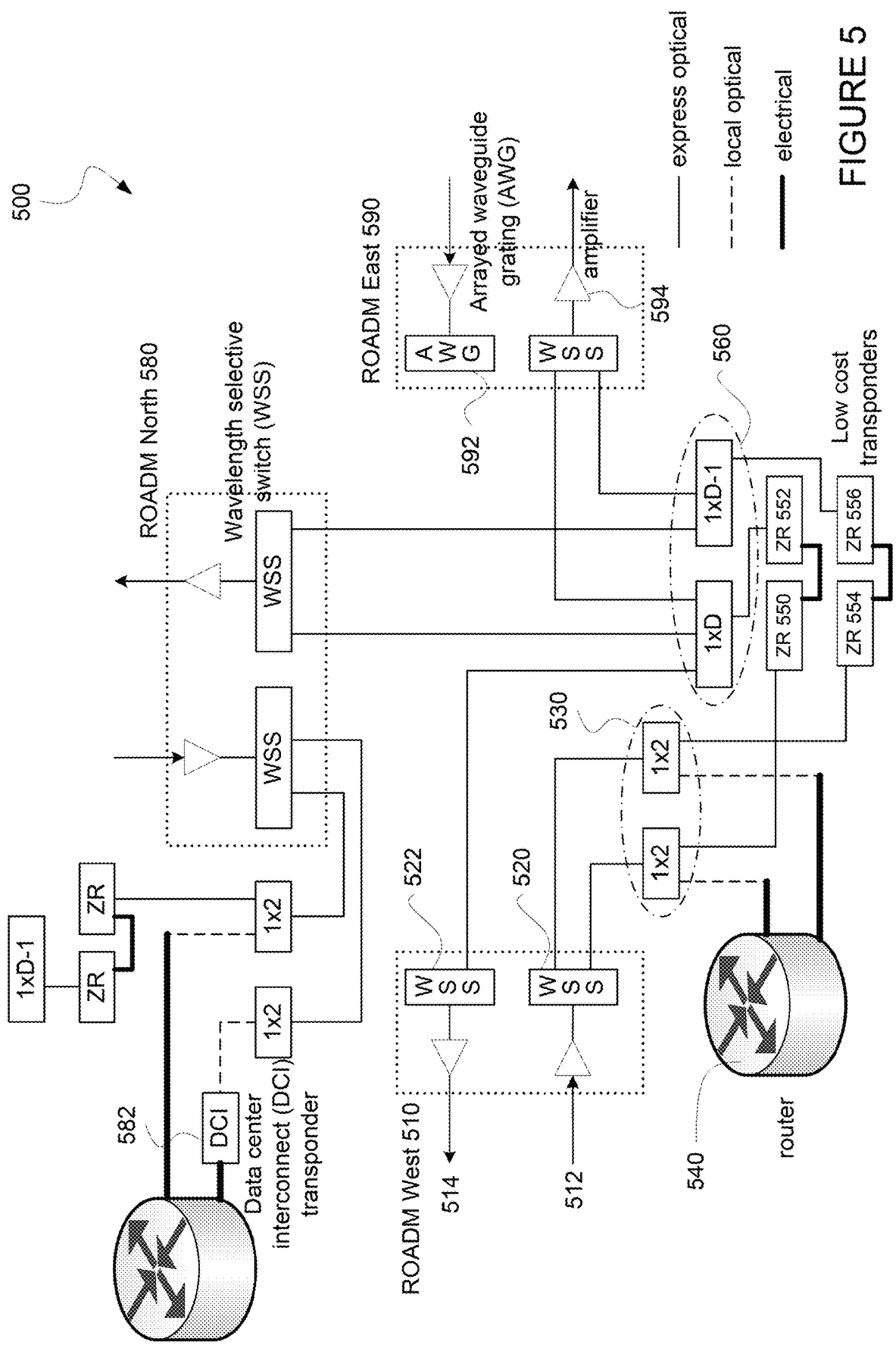
FIG. 5 shows an example node in a regenerative optical network in accordance with aspects of the disclosure.

To terminate and regenerate optical signals, nodes in the regenerative optical network 400 may include a number of components. FIG. 5 shows an example node 500 in a regenerative optical network, such as the node 420 in the regenerative optical network 400. As shown, node 500 has three degrees, ROADM West 510, ROADM North 580, and ROADM East 590, each of which may receive incoming signals from and/or transmit outgoing optical signals to other nodes of the regenerative optical network 400. For example, ROADM West 510 may be receiving optical signals from and/or transmitting optical signals to node 410, ROADM North 580 may be receiving optical signals from and/or transmitting optical signals to node 430, and ROADM East 590 may be receiving optical signals from and/or transmitting optical signals to node 450.

Although only a few degrees are depicted in FIG. 5, it should be appreciated that a typical node in a regenerative optical network can include a large number of degrees, such as 16 degrees. Further, although the degrees of node 500 are labeled as "West," "East," and "North," the degrees do not necessarily correspond to compass directions. The degrees may not even correspond to their relative positioning. Rather, these labels simply correspond to how the components are depicted in FIG. 5.

Referring to FIG. 5, incoming optical signals 512 may be received from node 410 at one or more incoming ports at ROADM West 510. The incoming optical signals 512 may be received at ROADM West 510 from a line port or a common port (not shown) and may be dispersed in wavelengths. For example, the incoming optical signals 512 may come from multiple channels of node 410, such as from a first channel of the first transponder A of node 410 and a second channel from the second transponder B of node 410 as shown in FIG. 4. As such, the incoming optical signals 512 may include an optical signal from the first channel having wavelength α and an optical signal from the second channel having wavelength β.

Thus, one or more switches or switching arrays, such as a wavelength selective switch ("WSS") array 520, may be configured to route optical signals from different channels in the incoming optical signals 512 to their respective express paths. In this regard, the switching may be frequency or wavelength selective, where the received incoming optical signals 512 may be routed from the common port to multiple local ports or channels (not shown) based on what wavelength(s) each local port is configured to receive. For example, WSS 520 may be configured to select two optical signals in the received incoming optical signals 512 based on wavelength, and route the two selected optical signals respectively to two local ports (two lines coming out of WSS 520), where each of the two local ports may be configured to receive one wavelength. Practically, WSS 520 may select optical signals and route the selected optical signals to many ports (e.g. 32) within the node 500, each of which may be configured to receive one or more wavelengths. This wavelength switching (routing) process may be dynamically changed through an electronic communication control interface on the WSS 520.

Once the incoming optical signals 512 are routed to different ports for different channels, one or more switches may be configured to route the optical signals to either local add/drop or express transit. For example, one or more 1×2 switches 530 may be configured to route optical signals to either local add/drop (dashed lines) or express transit (solid lines). For instance, based on traffic distribution across different geographical locations and/or datacenters, some portions of the incoming optical signals 512 may be routed to local add/drop for local traffic, while other portions of the incoming optical signals 512 may be routed to express transit. Optical signals routed to local add/drop may then be routed directly to servers and/or client machines. For example, the optical signals may be converted into electrical signals by a transponder (not shown), such as a ZR transponder, and then routed through a router 540. In contrast, optical signals routed to express transit may be routed further, such as to another degree of the node 500 to be transmitted to another node. In some instances such as where traffic in the regenerative optical network is highly asymmetric in terms of volume, broadcast and/or multicast may be implemented with 1×N or M×N switches, and optical transponders capable of multi-cast and/or broadcast.

Referring to the optical signals routed for express transit (solid lines from 1×2 switches 530), one or more transponders may be configured to terminate these optical signals and regenerate them. For example as shown, transponders 550, 552, 554, 556 may be configured to make the optical to electrical conversions for incoming optical signals 512 received at ROADM West 510. Further as shown, the transponders may be coupled in pairs. For instance, a first transponder 550 may convert the optical signal from the first channel into one or more electrical signals (bold line). Then, a second transponder 552 coupled to the first transponder 550 may convert the one or more electrical signals back or regenerated into an optical signal (solid line). Likewise, the pair of transponders 554 and 556 may perform the optical to electrical, and electrical to optical conversions for the optical signals from the second channel.

In this regard, the transponders may be any of a number of transponders. The transponders may be low cost and low energy transponders. For example as shown, the transponders may conform to a standard, such as 400ZR or ZR+ type transponders. ZR or ZR+ type transponders are transponders specifically designed to have a much smaller footprint both in terms of power consumption and physical size than DCI transponders. For instance, digital signal processing logic may be simplified to a bare minimum in ZR transponders as compared to DCI transponders. In this regard, if a traditional CDC network requires N number of DCI transponders, to achieve the same efficiency or capacity, the regenerative optical network 400 described herein may require N×(number of edges per node)×(capacity_ZR/capacity_DCI) number of ZR transponders. Thus, although in some instances more ZR transponders may be required in the regenerative optical network 400 to operate at a comparable performance level as the CDC network with DCI transponders, the low energy and low cost of the ZR transponders may still reduce the overall power usage and infrastructure cost.

Once electrical signals are regenerated as optical signals in express transit, one or more switches 560 may be configured to direct the regenerated optical signals to one or more outgoing ports at one or more degrees of the node. For example as shown in FIG. 5, a 1×D switch (where D is the number of degrees of the node, which in this case is 3) may be configured to direct the regenerated optical signal from the first channel to degrees ROADM North 580, ROADM East 590, or back to ROADM West 510. As another example, a 1×D−1 switch may be configured to direct the regenerated optical signal from the second channel to degree ROADM North 580 or ROADM East 590.

Since the outgoing optical signals may also come from more than one channel, one or more switches, such as WSS 522, may be provided on the outgoing side of a degree to combine the optical signals to be sent through an outgoing line port or common port. Subsequently, the regenerated optical signals may be transmitted to another node, for example via one or more edges in an express path as described above. For instance, an edge may be made of one or more fiber spans, where each fiber span is an optical fiber followed by an optical amplifier.

Each degree in the node may be configured similarly or differently. For example, ROADM North 580 in FIG. 5 is shown similar to ROADM West 510 in that incoming optical signals received at ROADM North 580 are routed to multiple ports by a WSS, the optical signals are then directed to either local add/drop (dashed lines) or express transit (solid lines), where the optical signals in express transit are converted into electrical signals and regenerated as optical signals by ZR transponders. Note that for ease of illustration, various components and lines are omitted from ROADM North 580. For example, transponders for express transit of one of the optical signals (for one of the lines out of incoming WSS) is omitted. As another example, lines representing regenerated optical signals are omitted, which would otherwise come out of switch 1×D−1 to reach various degrees in the node 500.

ROADM North 580 is shown configured differently from ROADM West 510 with respect to the local add/drop section. As shown, a DCI transponder 582 is provided for connection to a router. The DCI transponder 582 may terminate the optical signal, and convert the optical signal to one or more electrical signal(s) for transmission through the router. Connection (not shown) between the DCI transponder 582 and the router in ROADM North 580 may be implemented by one or more copper connections or low cost short reach optical modules, which are different from ROADM West 510. For example as mentioned above, the router 540 in ROADM West 510 may be provided with ZR based transponders (not shown) for optical to electrical conversion for local add/drop, the ZR based transponders are coherent, and therefore can be directly connected to the router 540.

Figure 2:
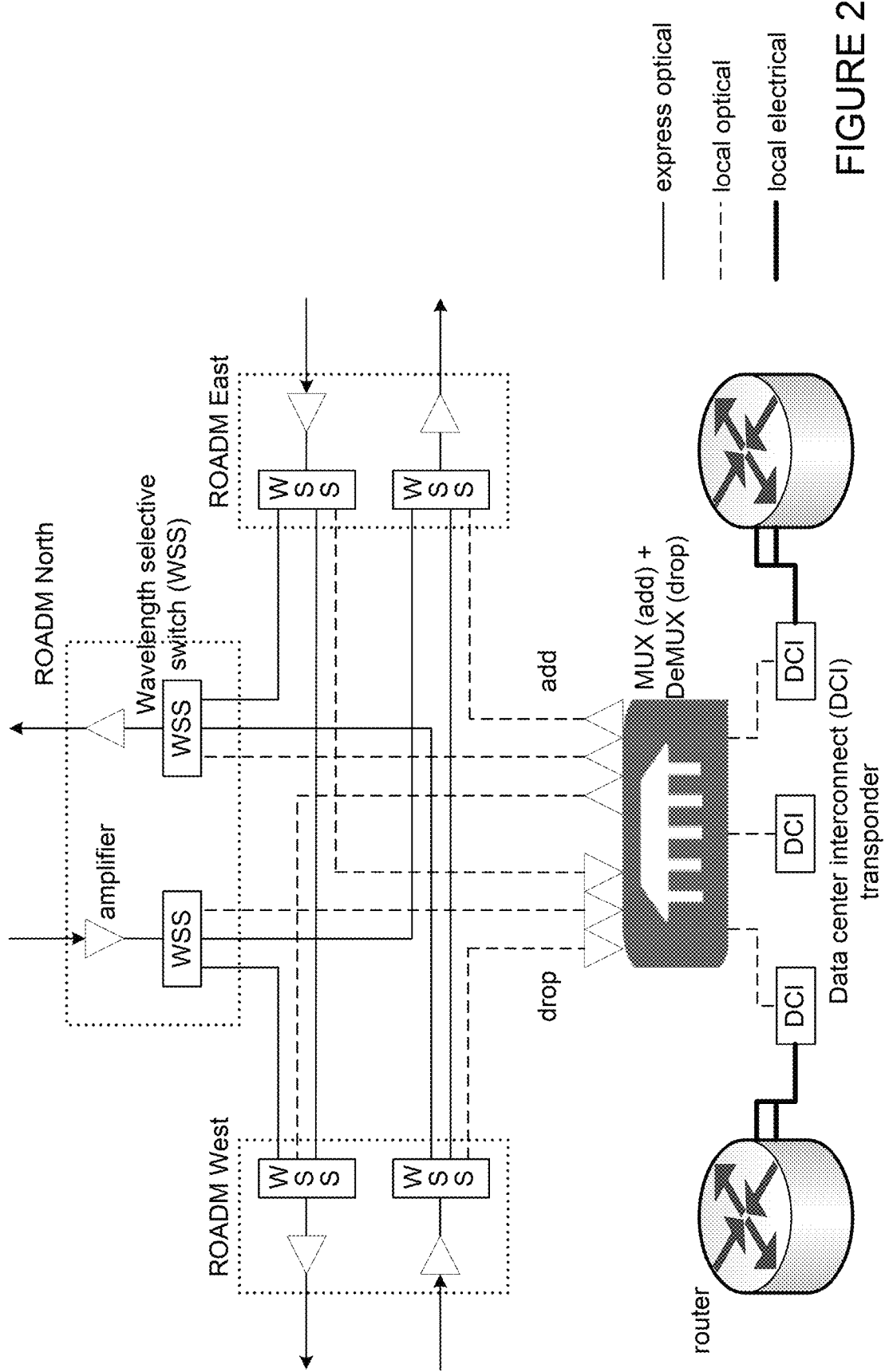
FIG. 2 shows an example node in a traditional CDC network in accordance with the prior art.

Since the number of DCI transponders are reduced as compared to the traditional CDC network shown in FIG. 2, cost and energy consumption of the node and therefore the regenerative optical network may be reduced. On the other hand, since DCI transponders can potentially provide higher spectral efficiency, a hybrid network with both ZR and DCI transponders, such as shown in FIG. 5, may further increase spectral efficiency of the regenerative optical network. Further as shown, the switches of FIG. 5 (such as 1×2 switches 530 and 1×D and 1×D−1 switches 560) replaced the add/drop structures of FIG. 2, which include complex MUX and DeMUX structures.

ROADM East 590 may also be configured similarly as ROADM West 510. Note that for ease of illustration, most components are omitted from ROADM East 590, including transponders, local add/drop, router, switches, etc. ROADM East 590 is intended to illustrate that, instead of a WSS, one or more switching arrays can be other types of switching arrays, such as an arrayed waveguide grating ("AWG"). Since AWG 592 is a passive element that does not allow reconfigurable selections of wavelengths as a WSS does, cost may be saved by using AWGs instead of WSSs in the node 500. Node 500 may further include any of a number of additional components. For example as shown, the node 500 may additionally include one or more amplifiers, such as amplifier 594.

Figure 6:
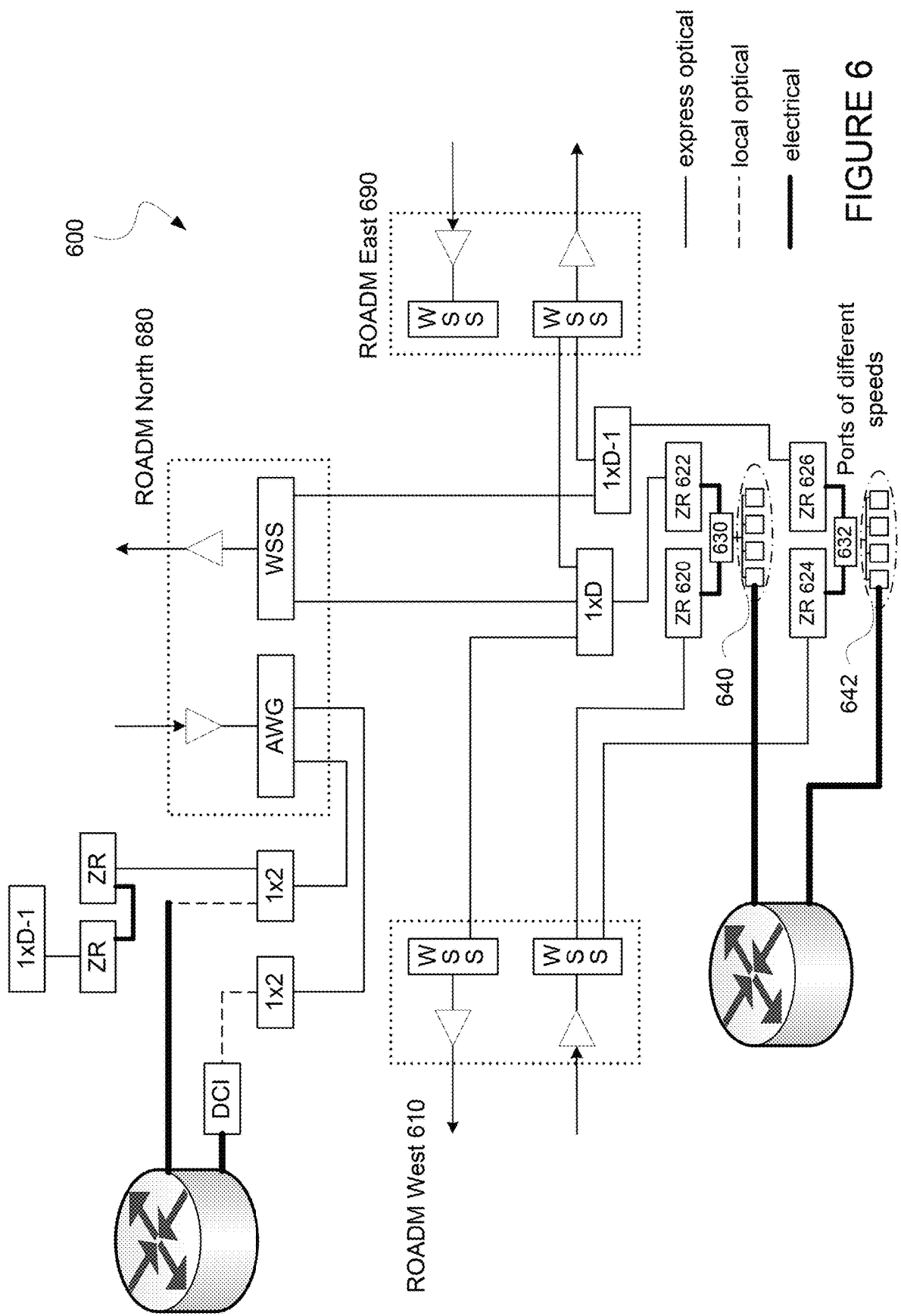
FIG. 6 shows another example node in a regenerative optical network in accordance with aspects of the disclosure.
Figure 7A:
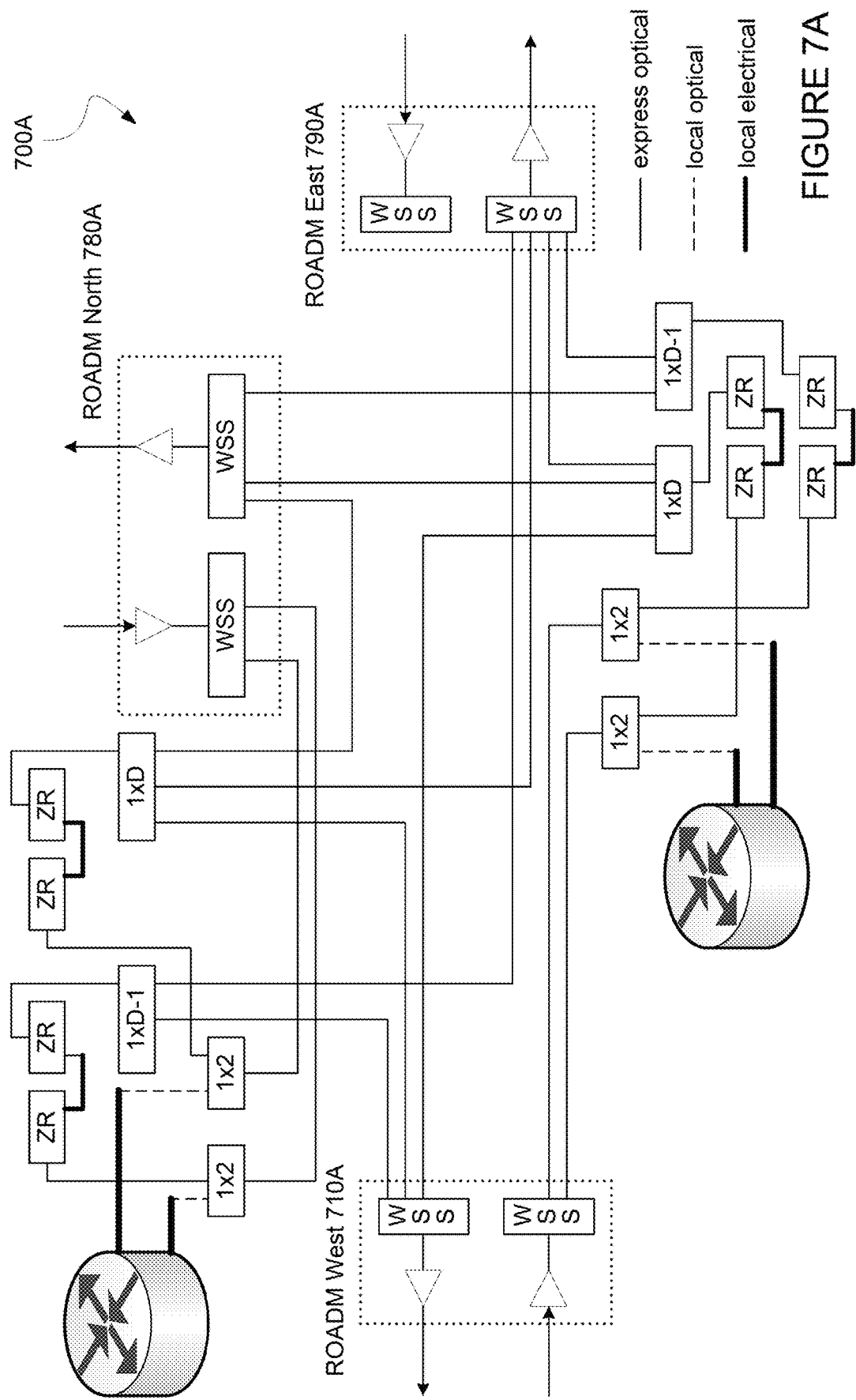
FIG. 7A shows another example node in a regenerative optical network in accordance with aspects of the disclosure.
Figure 7B:
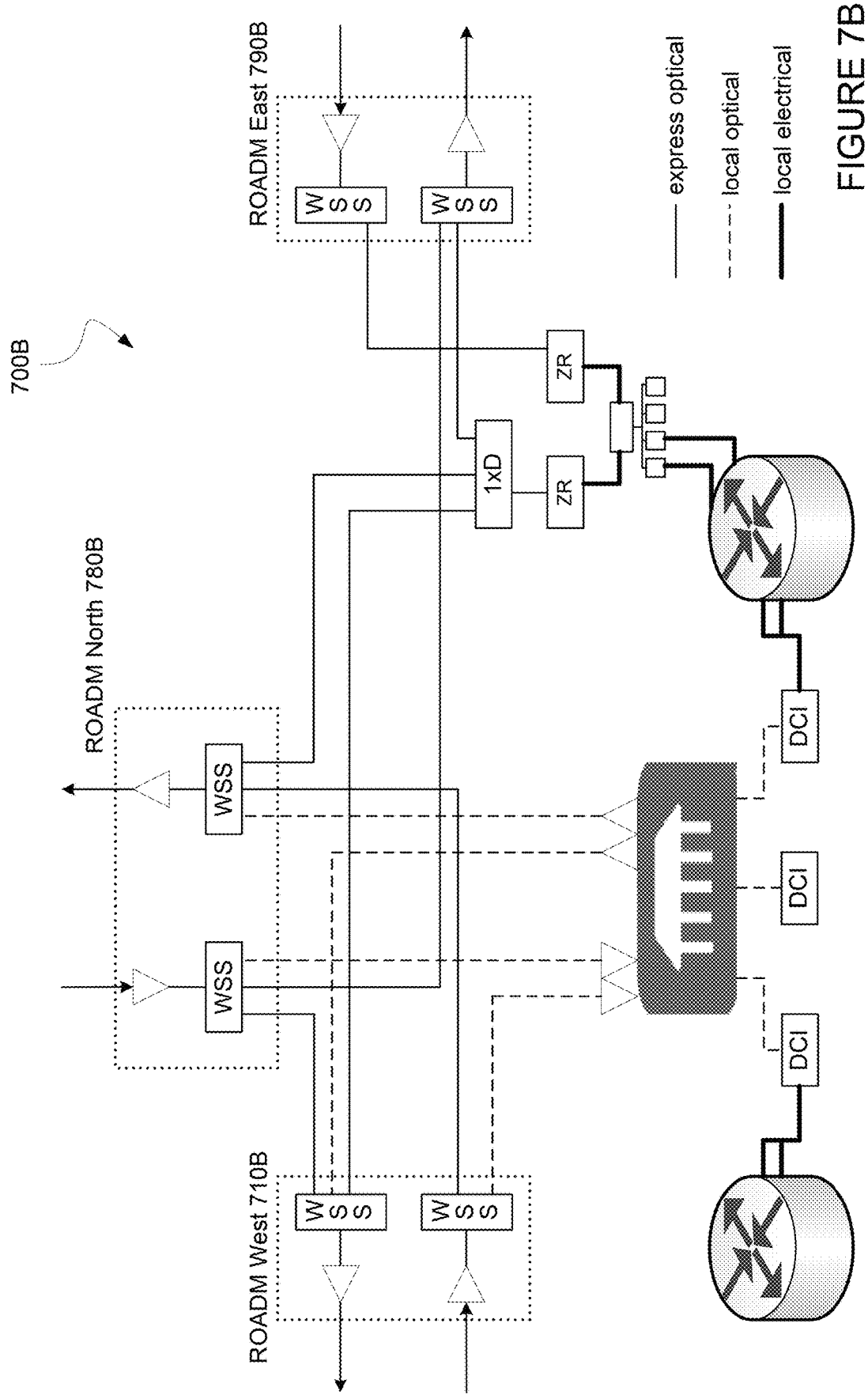
FIG. 7B shows another example node in a regenerative optical network in accordance with aspects of the disclosure.

FIGS. 6, 7A and 7B show other alternative configurations of example nodes in a regenerative optical network, such as regenerative optical network 400. Example nodes 600, 700A, and 700B each includes many of the features of example node 500, but with differences as discussed further below.

For instance, referring to example node 600 of FIG. 6, for ROADM West 610, the local add/drop section has a different configuration as ROADM West 510 of FIG. 5. As shown, transponders 620, 622, 624, 626 configured for optical to electrical conversions for express transit may also be used for local transit. For example, transponder 620 may convert an incoming optical signal into one or more electrical signal(s) and direct the electrical signal(s) to a common port 630. The common port 630 may in turn be connected to multiple ports 640 potentially having different speeds. For example, a router 650 may have a port with a speed matching one of the multiple ports 640. Alternatively, if the router 650 does not have a port with a speed matching any of the multiple ports 640, the port with the higher speed may be throttled. Further, an AWG is shown in ROADM North 680 of FIG. 6, instead of ROADM East 590 in FIG. 5.

Referring to example node 700A of FIG. 7A, ROADM West 710A is shown configured the same way as ROADM West 510, but ROADM North 780A is shown with a different configuration as ROADM North 580 of FIG. 5. For example, no DCI transponder is used in ROADM North 780A. Rather, ROADM North 780A is shown with identical configuration as ROADM West 710A (and ROADM West 510), using ZR transponders. By not using any DCI transponders, node 700A may further reduce energy consumption.

Referring to FIG. 7B, node 700B is shown as a hybrid node that includes both regenerative and traditional CDC network components. For example, ROADM West 710B and ROADM North 780B are each shown connected to traditional CDC add/drop structures similar to those shown in FIG. 2. In contrast, ROADM East 790B is shown with similar components as ROADM West 610 of FIG. 6, including ZR transponders for regenerating optical signals for express transit. Note that the signals for local add/drop for ROADM East 790B may also be connected to traditional CDC add/drop structures. By combining traditional CDC degrees and add/drop structures with degrees similar to those described by FIGS. 5-7A, the hybrid node 700B of FIG. 7B may simplify transition from one system to another. Further, such hybrid nodes may provide capability to optimize for different routes/paths in the regenerative optical network.

Although FIGS. 5, 6, 7A, 7B illustrate some example configurations of nodes in the regenerative optical network 400, other configurations are possible. Nodes in the regenerative optical network 400 may be configured similarly or differently from one another. For example, some nodes in the regenerative optical network may be configured similarly as shown in FIG. 2, while other nodes in the regenerative optical network may be configured similarly as shown in FIGS. 5-7B, making the overall network a hybrid of different types of nodes including traditional CDC nodes, regenerative nodes, and/or hybrid nodes. As other examples, some nodes of the regenerative optical network 400 may include one or more degrees that only include local termination or express transit, but not both. Likewise, some nodes of the regenerative optical network 400 may be configured for only local termination or express transit, but not both.

Figure 3:
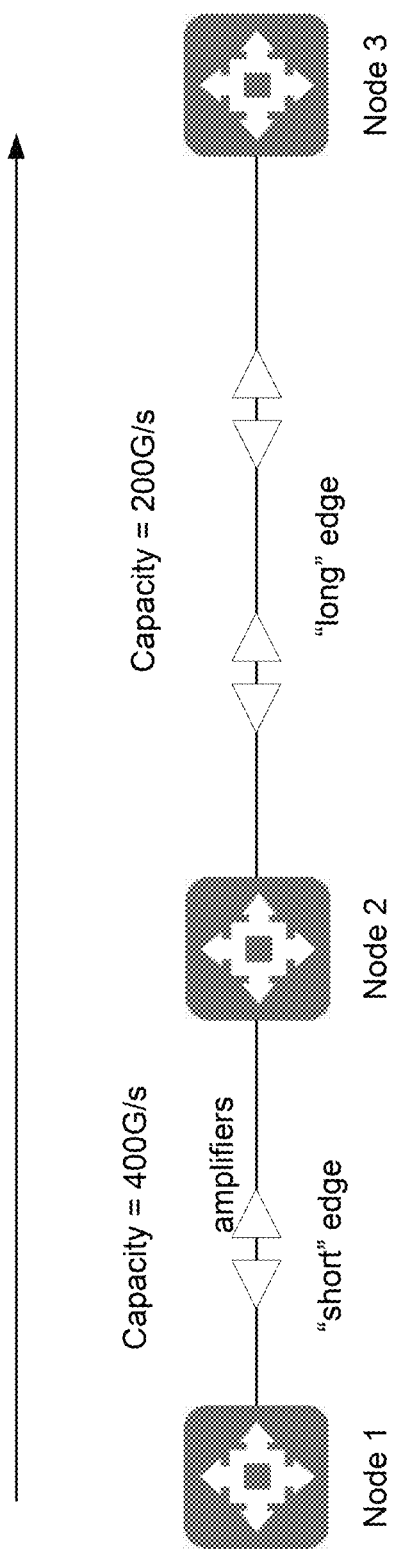
FIG. 3 shows example noise accumulation along an express path in a traditional CDC network in accordance with the prior art.

In another aspect, the regenerative optical network may be configured with features that mitigate the effects of noise asymmetry on transmission efficiency and capacity. As mentioned above with respect to FIG. 3, in the traditional CDC network, an overall capacity bottleneck may be introduced by the total accumulated noise along all edges along an express path. Although such noise accumulation does not occur along an express path in a regenerative optical network, such as express path 480, inefficiencies may be introduced by noise asymmetry along different edges in an express path.

Figure 8:
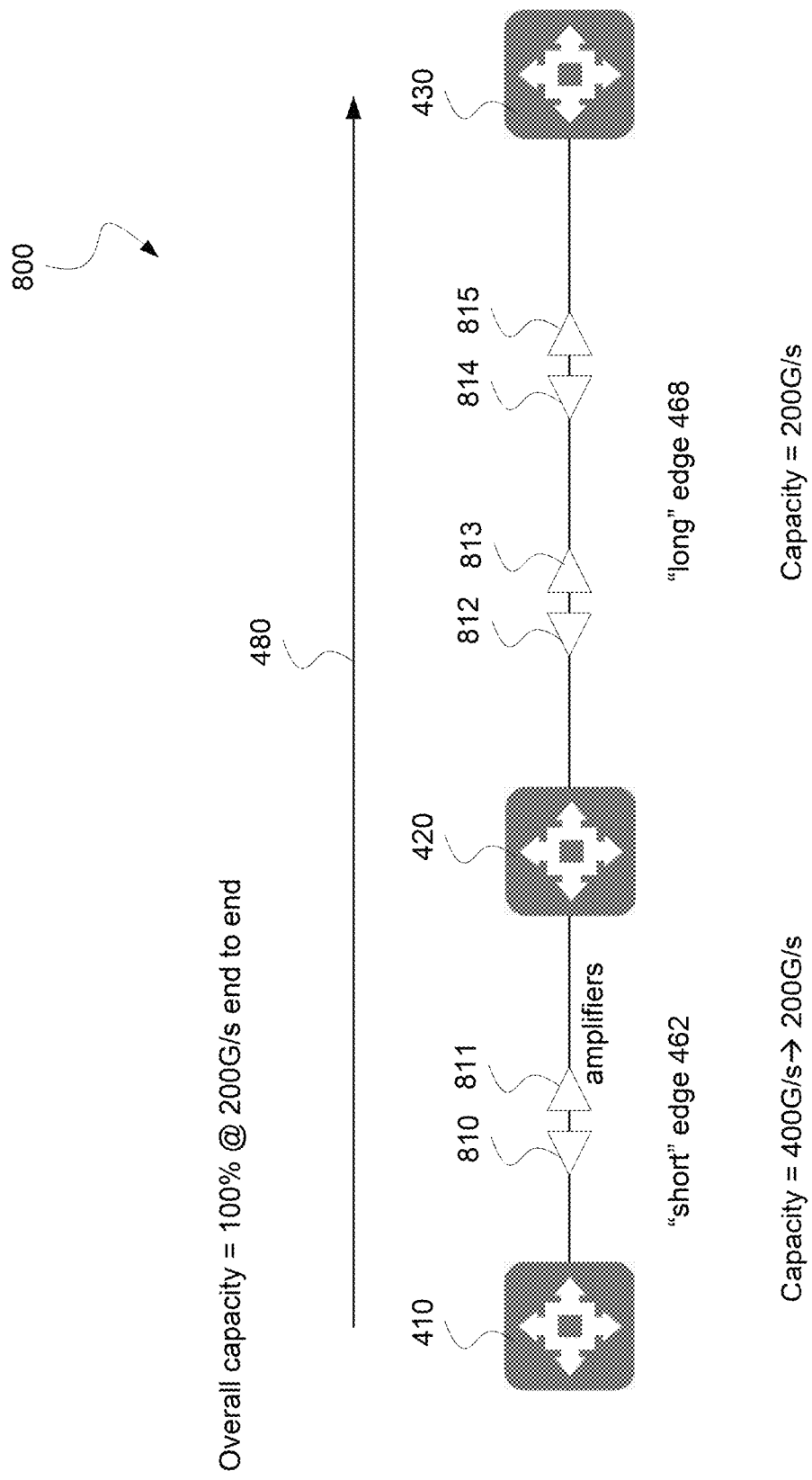
FIG. 8 shows example asymmetrical edges connecting nodes along an express path in a regenerative optical network in accordance with aspects of the disclosure.

For instance, FIG. 8 shows an example configuration 800 for mitigating effects of asymmetric edges. As shown, an express path, such as express path 480 connecting nodes 410, 420, and 430 of regenerative optical network 400 may include edges 462 and 468. Further as shown, the edges 462 and 468 may be asymmetric, for example as a result of practical constraints, such as available locations where the infrastructure can be built. As such, the relative longer edge 468 may require more amplifiers, shown with amplifiers 812, 813, 814, and 815, than the relative shorter edge 462, shown with amplifiers 810 and 811. Since each amplifier adds noise to the optical signals, the edges 462 and 468 may be asymmetric in terms of accumulated optical noise. As such, data transmission along edge 468 of express path 480 may occur at a lower spectral efficiency (bit/s/Hz) than data transmission along edge 462. For example, achievable capacity (bit/s) of an optical signal in wavelength $\beta$ may be higher along edge 462, shown as 400 G/s, than along edge 468, shown as 200 G/s.

Thus, in the example shown in FIG. 8, nodes connected by asymmetric edges may be configured to transmit optical signals at a capacity that is a lowest denominator of achievable capacities along the express path. For example as shown, nodes 410, 420, and 430 connected by asymmetric edges 462 and 468 may be configured to transmit optical signals at a capacity that is a lowest denominator 200 G/s of achievable capacities along the express path 480. This may be accomplished by changing a setting at the nodes 410, 420, and/or 430. This way, instead of having an overall, less than full capacity utilization of the 200 G/s-300 G/s, for example 80% or less due to wavelength contentions along edges, full utilization 100% may be made of the overall capacity of 200 G/s.

FIG. 9A shows another example configuration 900 for mitigating effects of asymmetric edges using an intermediate regenerative node. Example configuration 900 includes many of the features of example configuration 800, but with differences as discussed further below. For instance, an intermediate regenerative node, such as intermediate regenerative node 910, may split the relatively longer edge 468 into two edges 920 and 930. The intermediate regenerative node 910 may be configured to terminate and regenerate optical signals similarly as the nodes shown in FIGS. 5-7. The intermediate regenerative node 910 may be positioned between the nodes 420 and 430, for example halfway between the nodes 420 and 430 or some other available location. As shown, the newly created two edges 920 and 930 each have fewer amplifiers than the original longer edge 468, and thus each contribute less noise than the original longer edge 468. Since terminating and regenerating optical nodes prevent optical noise to accumulate over multiple edges, the overall noise along edges 920 and 930 is lower than noise accumulated over the original longer edge 468.

In the particular example shown in FIG. 9A, the intermediate regenerative node 910 may be positioned such that 300 G/s can be achieved along both the edges 920 and 930 (e.g., 300 G/s along edge 920 and 300 G/s along edge 930). As such, node 410 and the shorter edge 462 may be re-configured to transmit optical signals that is the lowest denominator 300 G/s achievable along the express path 480 (for example by changing a setting at the node 410). As another example, when the intermediate regenerative node 910 is positioned somewhere else between nodes 420 and 430, different capacities may be achievable along edge 920 and edge 930 (e.g., 400 G/s at both), based on which the node 410 and the shorter edge 462 may be configured (e.g., 400 G/s).

Figure 9B:
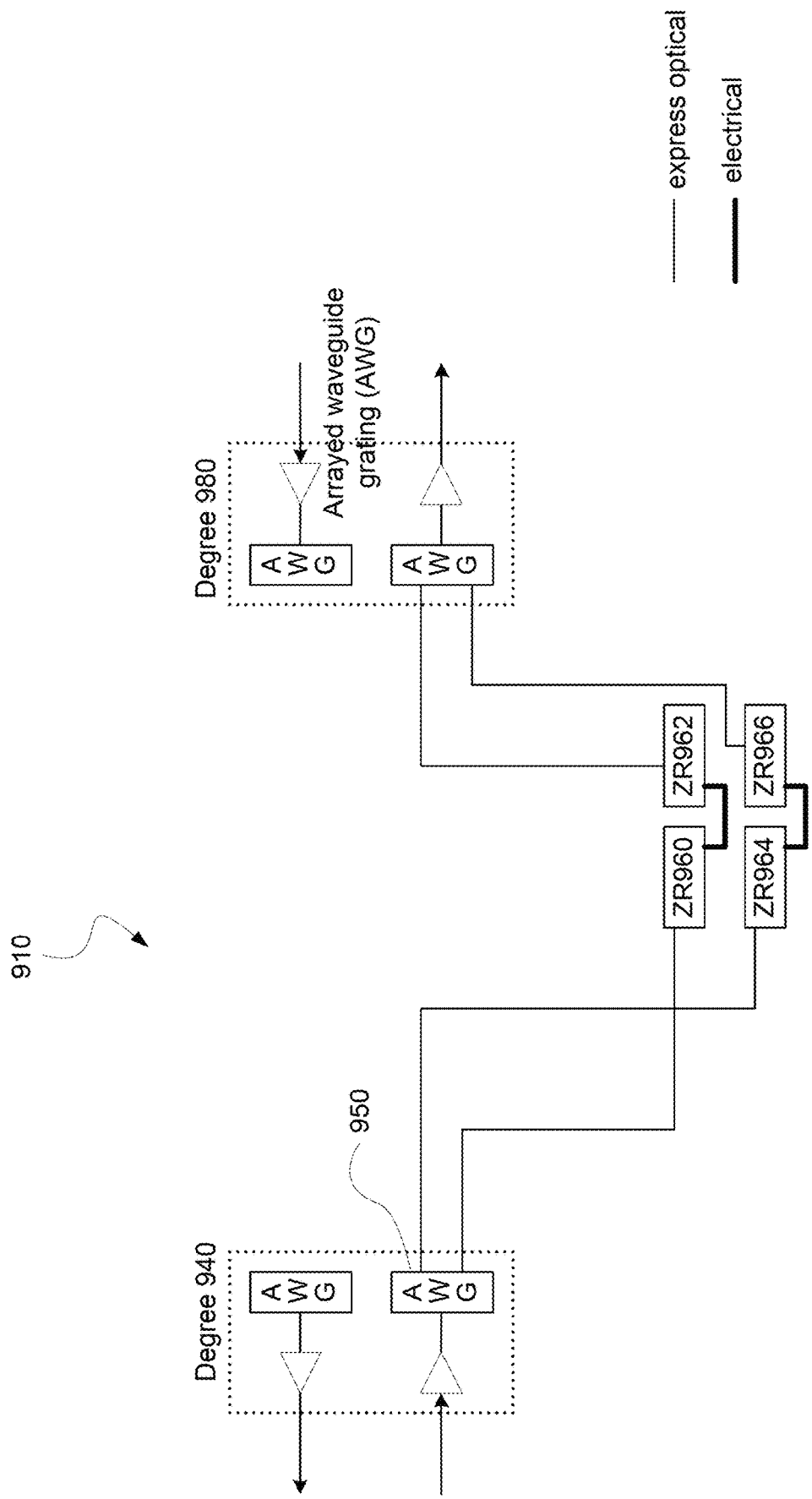
FIG. 9B shows an example intermediate regenerative node in accordance with aspects of the disclosure.

FIG. 9B shows an example intermediate regenerative node, such as the intermediate regenerative node 910 of FIG. 9A. Intermediate regenerative node 910 includes many of the features of example node 500. For instance, the intermediate regenerative node 910 may include wavelength selective arrays, such as AWG 950, which may be designed similarly as AWG 592. For example, AWG 950 may route optical signals of dispersed wavelengths from multiple channels received at a common port to multiple local ports (here shown as two ports). The intermediate regenerative node 910 may include one or more transponders, such as transponders 960, 962, 964, 966 configured to make the optical to electrical conversions. The transponders 960, 962, 964, 966 may be configured the same way as transponders 550, 552, 554, 556 of FIG. 5. For example, the transponders may be coupled in pairs. The first transponder 960 may convert the optical signal from a channel into one or more electrical signals (bold line). Then, a second transponder 962 coupled to the first transponder 960 may convert the one or more electrical signals back or regenerated into an optical signal (solid line).

The intermediate regenerative node 910 may be configured differently from other regenerative nodes of the regenerative optical network. For instance, the intermediate regenerative node 910 may include only degrees leading to the nodes whose connecting edge is being split. As such, in this example the intermediate regenerative node 910 is shown with two degrees, degree 940 leading to node 420, and degree 980 leading to node 430. Further, since the intermediate regenerative node 910 is configured to split along only one direction, there is no need for switches. The intermediate regenerative node 910 also may not include any features for local add/drop, since the intermediate regenerative node 910 is designed to split an edge in express transit between two nodes. As with FIGS. 5-7, for ease of illustration, various components and lines are omitted from degree 980, which may be configured similarly as degree 940.

Figure 10A:
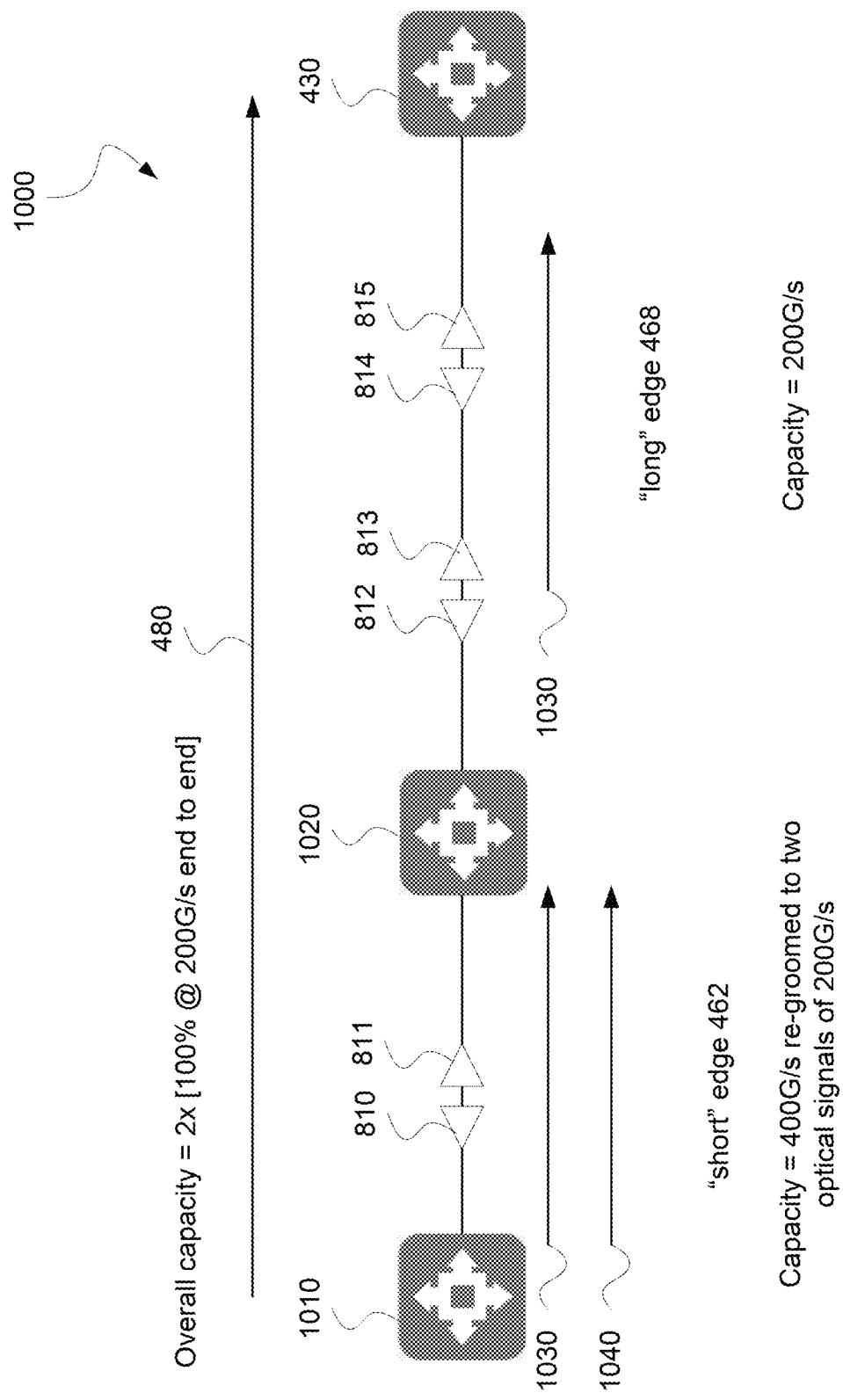
FIG. 10A shows example asymmetrical edges with re-groomed signals in accordance with aspects of the disclosure.

FIG. 10A shows yet another example configuration 1000 for mitigating effects of asymmetric edges by re-grooming optical signals. Example configuration 1000 includes many of the features of example configuration 800, but with differences as discussed further below. For instance, nodes 410 and/or 420 of FIG. 8 may be re-configured with features configured to re-groom optical signals, shown as re-grooming nodes 1010 and 1020 in FIG. 10A. Thus as shown, re-grooming node 1010 may re-groom an optical signal carrying 400 G/s of data to be transmitted over shorter edge 462 into two re-groomed optical signals 1030 and 1040 each carrying 200 G/s of data. This way, at a given time or time period, one of the re-groomed optical signals 1030 or 1040 may be transmitted through edge 468. As such, the extra 200 G/s capacity along the shorter edge 462 may be used for transmission of other optical signals. Although re-grooming by splitting in two optical signals of equal capacity is shown, in other examples an optical signal may be re-groomed into more than two signals, and/or each with same or different capacities.

Figure 10B:
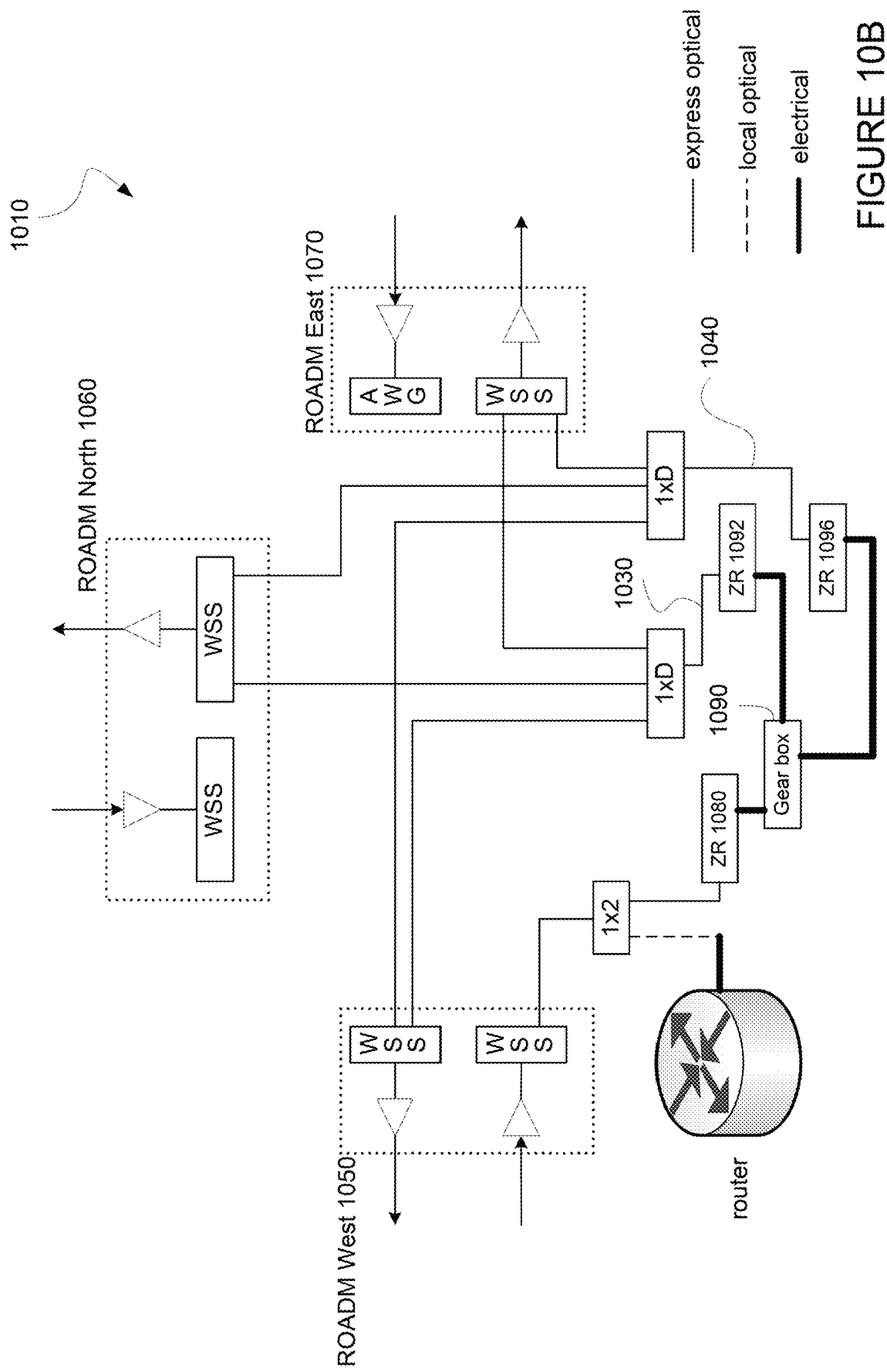
FIG. 10B shows an example node with re-grooming features in accordance with aspects of the disclosure.

FIG. 10B shows an example node configured to re-groom optical signals, such as re-grooming node 1010 of FIG. 10A. As shown, re-grooming node 1010 may include many of the features of example node 500, such as switching arrays, switches, amplifiers, etc. As with FIGS. 5-7, for ease of illustration, various components and lines are omitted from degrees ROADM North 1060 and ROADM East 1070. Further, only one port is shown at the incoming WSS of ROADM West 1050. As shown in FIG. 10B, once the incoming optical signals are converted into electrical signals by a transponder 1080, the electrical signals may be re-groomed by a gear box 1090 into two electrical signals of smaller capacities. The two electrical signals may then each be regenerated into optical signals by transponders, such as transponders 1082, 1084, and further routed. The transponders 1080, 1082, and 1084 may be configured similarly as transponders 550, 552, 554, 556 of FIG. 5, for example the transponders 1080, 1082, 1084 may each be a ZR type transponder. Alternatively, packet processors such as a switch or router may be used to re-groom the electrical signals.

FIG. 11 illustrates an example block diagram of some components in a node in a regenerative optical network, such as node 500 in the regenerative optical network 400. It should not be considered as limiting the scope of the disclosure or usefulness of the features described herein. In this example, the node 500 is shown with one or more computing devices 1100. The computing devices 1110 contains one or more processors 1120, memory 1130 and other components typically present in general purpose computing devices. Memory 1130 of the computing devices 1110 can store information accessible by the one or more processors 1120, including instructions 1134 that can be executed by the one or more processors 1120. For instance, configuration and re-configuration of a regenerative optical network as discussed above with respect to the examples shown in FIGS. 4-10B may be performed by the one or more processors 1120 according to instructions 1134 and data 1132 in memory 1130.

Memory 1130 can also include data 1132 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

Data 1132 may be retrieved, stored, or modified by the one or more processors 1120 in accordance with the instructions 1134. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, propriety codes, pointers, references to data stored in other memories such as at other network locations, or information that is used by a function to calculate the relevant data. As shown, the data 1132 may include data on various components of the node 500 and of the regenerative optical network 400.

The instructions 1134 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. As shown, the instructions 1134 may include functions or methods for controlling various components of the node 500 to perform routing, conversion, etc.

The one or more processors 1120 can be any conventional processors, such as a commercially available CPU. Alternatively, the processors can be dedicated components such as an application specific integrated circuit ("ASIC") or other hardware-based processor. Although not necessary, one or more of the computing devices 1110 may include specialized hardware components to perform specific computing processes.

Although FIG. 11 functionally illustrates the processor, memory, and other elements of computing devices 1110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 1110. Accordingly, references to a processor, computer, computing device, or memory will be understood to include references to a collection of processors, computers, computing devices, or memories that may or may not operate in parallel. For example, the computing devices 1110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 1110 may be capable of directly and indirectly communicating with other nodes of the regenerative optical network 400. Computing devices in the regenerative optical network 400, such as computing devices 1100, may be interconnected using various protocols and systems, such that computing devices in the regenerative optical network 400 can be part of the Internet, World Wide Web, specific intranets, wide area networks, or local networks. Computing devices in the network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 12:
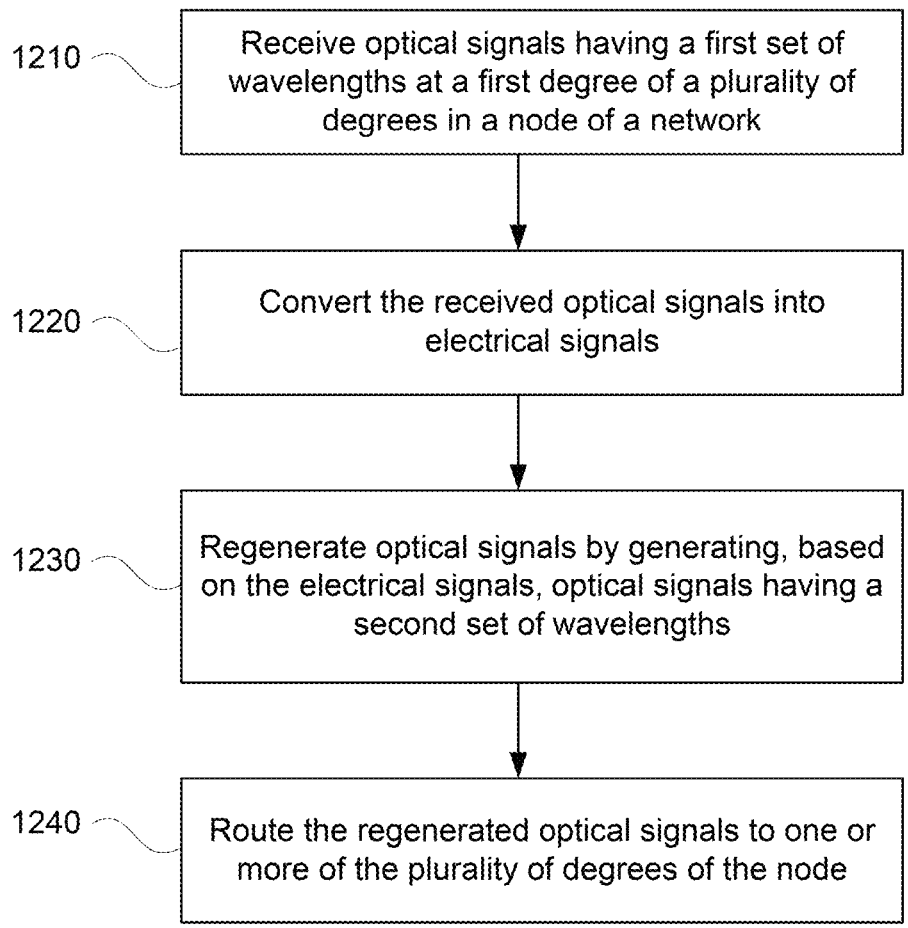
FIG. 12 is a flow diagram in accordance with aspects of the disclosure.

For instance, FIG. 12 shows an example flow diagram that may be performed by a regenerative optical network, such as the regenerative optical network 400. For example, a node in the regenerative optical network 400, such as node 500, 600, 700A, or 700B may receive optical signals, and route the optical signals to other nodes in the regenerative optical network 400. In some instances, the flow diagram may at least partially be performed by computing devices in the regenerative optical network 400, such as computing devices 1100 shown in FIG. 11.

Referring to FIG. 12, in block 1210, optical signals having a first set of wavelengths are received at a first degree of a plurality of degrees in a node of a network. For example as shown in FIG. 5, incoming optical signals 512 may be received at degree ROADM West 510.

In block 1220, the received optical signals are converted into electrical signals. In this regard, one or more transponders may convert the received optical signals into electrical signals. For example as shown in FIG. 5, transponders 550 and 552 are shown as coupled, where transponder 550 may be configured to convert incoming optical signal 512 into electrical signals.

In block 1230, optical signals having a second set of wavelength are generated based on the electrical signals, resulting in "regenerated" optical signals. For example as shown in FIG. 5, transponders 550 and 552 are shown as coupled, where transponder 552 may be configured to convert the electrical signals from transponder 550 back into optical signals. The regenerated signals may have any wavelength, including having the same wavelength as the incoming optical signals, or different wavelength as the incoming optical signals.

In block 1240, the regenerated optical signals are routed to one or more of the plurality of degrees of the node. In this regard, one or more switches may be configured to route the regenerated optical signals. For example as shown in FIG. 5, one or more switches 560 may be configured to route the regenerated optical signals to one or more of degrees ROADM North 580, ROADM East 590 and/or ROADM West 510.

In some instances, the received optical signals may be routed to a plurality of ports each configured for receiving one or more wavelengths of the first set of wavelengths. One or more switches may be configured to perform the routing. For example as shown in FIG. 5, switch arrays such as WSS 520 and AWG 592 may route the incoming optical signals 512 to different ports within the node 500.

In addition, a first portion of the received optical signals may be routed to a local termination, while a second portion of the received optical signals to an express transit. One or more switches may be configured to perform the routing. For example as shown in FIG. 5, switches 530 may be configured to route the incoming optical signal 512 to a local termination, for example converting to electrical signals to be transmitted to a router 540. Alternatively or additionally, as shown in FIG. 6, once converted into electrical signals, the electrical signals may be divided into different ports 640, 642 having different speeds, before connecting to a router. Also as shown in FIG. 5, switches 530 may be configured to route the incoming optical signal 512 to an express transit, for example, converted and regenerated by transponders 550-556, and further routed by switches 560 to ROADM North 580, ROADM East 590, etc.

In another aspect as described above with respect to FIGS. 8-10B, additional methods may be used to mitigate the effects of noise asymmetry on transmission efficiency and capacity. In the example shown in FIG. 8, optical signals may be transmitted at a capacity that is a lowest denominator among achievable capacities of different edges along an express path. In the examples shown in FIGS. 9A-B, an edge with a higher achievable capacity in an express path may be split into multiple edges by one or more additional regenerative nodes. Alternatively, in the example shown in FIGS. 10A-B, an optical signal along an edge carrying higher data volume may be re-groomed into multiple optical signals each carrying a lower data volume, so that remaining capacity along that edge can be used for transmitting other optical signals.

The technology is advantageous because it provides an energy and cost efficient mesh optical network. As described above, the regenerative optical network prevents network fragmentation and blocking to increase edge utilization, which in some instances may reach up to 100%. Since the optical signals are regenerated at each node along an express path, noise is not accumulated along multiple edges of the express path. The regenerative optical network also provides for features that increase transmission efficiency and capacity along an express path with edges that are asymmetric with respect to noise. Further, compared to a traditional CDC network using high performance transponders, the regenerative optical network may use low energy and low cost transponders to reduce the overall power usage and infrastructure cost.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
one or more transponders configured to:
receive optical signals having a first set of wavelengths at a first degree of a plurality of degrees in a node of a network;
convert a first portion of the received optical signals into electrical signals; and
regenerate optical signals by generating, based on the electrical signals, optical signals having a second set of wavelengths;
one or more first switches configured to route the regenerated optical signals to one or more of the plurality of degrees of the node; and
one or more second switches configured to:
route the first portion of the received optical signals to an express transit, wherein the optical signals having the second set of wavelengths are regenerated using the first portion of the received optical signals in the express transit; and
route a second portion of the received optical signals to a local termination.

2. The system of claim 1, wherein the one or more first switches include one or more wavelength selective switches (WSS) configured to route the received optical signals to a plurality of ports each configured for receiving one or more wavelengths of the first set of wavelengths.

3. The system of claim 1, wherein the one or more first switches include one or more wavelength selective switches (WSS) configured to route the regenerated optical signals to another node of the network.

4. The system of claim 1, wherein the one or more first switches include one or more arrayed waveguide gratings (AWG) configured to route the received optical signals to a plurality of ports each configured for receiving one or more wavelengths of the first set of wavelengths.

5. The system of claim 1, further comprising:
a router connected to the local termination.

6. The system of claim 1, further comprising:
one or more data center interconnect (DCI) transponders configured to:
convert the second portion of the received optical signals in the local termination into electrical signals; and
route the electrical signals in the local termination to one or more routers.

7. The system of claim 1, further comprising:
a plurality of ports configured to transport electrical signals in the local termination at a respective plurality of transmission speeds.

8. The system of claim 1, wherein at least one of the one or more transponders are ZR transponders.

9. A network, comprising:
a first node having a first edge connected to a second node and a second edge connected to a third node, wherein the first edge has a first spectral efficiency and the second edge has a second spectral efficiency, the first spectral efficiency being higher than the second spectral efficiency, wherein the first node comprises:
one or more transponders configured to:
receive optical signals having a first set of wavelengths at a first degree of a plurality of degrees in the first node;
convert the received optical signals into electrical signals; and
regenerate optical signals by generating, based on the electrical signals, optical signals having a second set of wavelengths; and
one or more switches configured to route the regenerated optical signals to one or more of the plurality of degrees of the first node; and
an intermediate regenerative node configured to:
convert the optical signals from the first node into electrical signals;
regenerate, based on the electrical signals, new optical signals; and
route the new optical signals to the third node;
wherein the intermediate regenerative node is positioned along the second edge between the first node and the third node such that a difference between the first spectral efficiency and the second spectral efficiency decreases.

10. The network of claim 9, wherein the one or more switches include one or more wavelength selective switches (WSS) configured to route the received optical signals to a plurality of ports each configured for receiving one or more wavelengths of the first set of wavelengths and to route the regenerated optical signals to another node of the network.

11. The network of claim 9, wherein the one or more switches include one or more arrayed waveguide gratings (AWG) configured to route the received optical signals to a plurality of ports each configured for receiving one or more wavelengths of the first set of wavelengths.

12. The network of claim 9, wherein the first node further comprises:
one or more second switches configured to:
route a first portion of the received optical signals to a local termination; and
route a second portion of the received optical signals to an express transit.

13. The network of claim 12, wherein the first node further comprises:
one or more data center interconnect (DCI) transponders configured to:
convert the first portion of the received optical signals in the local termination into electrical signals; and
route the electrical signals in the local termination to one or more routers.

14. The network of claim 12, wherein the first node further comprises:
a plurality of ports configured to transport electrical signals in the local termination at a respective plurality of transmission speeds.

15. The network of claim 9, wherein at least one of the one or more transponders are ZR transponders.

16. A network, comprising:
a first node having a first edge connected to a second node and a second edge connected to a third node, wherein the first edge has a first spectral efficiency and the second edge has a second spectral efficiency, the first spectral efficiency being higher than the second spectral efficiency, wherein the first node is further configured to:
convert a received optical signal of a first capacity into a first electrical signal;
split the first electrical signal into a plurality of electrical signals each having a capacity smaller than the first capacity;
regenerate optical signals by converting each of the plurality of electrical signals into a new optical signal to be transmitted through the second edge.

17. The network of claim 16, wherein the second node and the third node are configured to communicate with each other through optical signals of a first wavelength along the first edge and optical signals of a second wavelength along the second edge, wherein the optical signals are converted from the first wavelength to the second wavelength at the first node.

18. The network of claim 16, wherein the second node and the third node are configured to communicate with each other through optical signals of a first wavelength along the first edge and optical signals of a second wavelength along the second edge, wherein the optical signals are converted from the first wavelength to the second wavelength at the first node.

19. The network of claim 16, wherein the first node comprises:
one or more transponders configured to:
receive optical signals having a first set of wavelengths at a first degree of a plurality of degrees in the first node;
convert the received optical signals into electrical signals; and
regenerate optical signals by generating, based on the electrical signals, optical signals having a second set of wavelengths; and
one or more switches configured to route the regenerated optical signals to one or more of the plurality of degrees of the first node.

20. The network of claim 19, wherein the one or more switches include one or more wavelength selective switches (WSS) configured to route the received optical signals to a plurality of ports each configured for receiving one or more wavelengths of the first set of wavelengths and to route the regenerated optical signals to another node of the network.

21. The network of claim 19, wherein the one or more switches include one or more arrayed waveguide gratings (AWG) configured to route the received optical signals to a plurality of ports each configured for receiving one or more wavelengths of the first set of wavelengths.

22. The network of claim 19, wherein the first node further comprises:
one or more second switches configured to:
route a first portion of the received optical signals to a local termination; and
route a second portion of the received optical signals to an express transit.

23. The network of claim 22, wherein the first node further comprises:
one or more data center interconnect (DCI) transponders configured to:
convert the first portion of the received optical signals in the local termination into electrical signals; and
route the electrical signals in the local termination to one or more routers.

24. The network of claim 19, wherein the first node further comprises:
a plurality of ports configured to transport electrical signals in the local termination at a respective plurality of transmission speeds.

25. The network of claim 19, wherein at least one of the one or more transponders are ZR transponders.

26. A method, comprising:
receiving optical signals having a first set of wavelengths at a first degree of a plurality of degrees in a node of a network;
routing a first portion of the received optical signals to an express transit;
routing a second portion of the received optical signals to a local termination;
converting the first portion of the received optical signals in the express transit into electrical signals;
regenerating optical signals by generating, based on the electrical signals, optical signals having a second set of wavelengths; and
routing the regenerated optical signals to one or more of the plurality of degrees of the node.

27. The method of claim 26, further comprising:
routing the received optical signals to a plurality of ports each configured for receiving one or more wavelengths of the first set of wavelengths.

28. The method of claim 26, further comprising:
converting the second portion of the received optical signals in the local termination into electrical signals;
routing the electrical signals in the local termination through a router.

29. The method of claim 26, further comprising:
transporting the electrical signals in the local termination through a plurality of ports at a respective plurality of transmission speeds.

30. The method of claim 26, wherein the node has a first edge connected to a second node and a second edge connected to a third node, wherein the first edge has a first spectral efficiency and the second edge has a second spectral efficiency, the first spectral efficiency being higher than the second spectral efficiency.

31. The method of claim 30, further comprising:
converting a received optical signal of a first capacity into a first electrical signal;
splitting the first electrical signal into a plurality of electrical signals each having a capacity smaller than the first capacity;
regenerating optical signals by converting each of the plurality of electrical signals into a new optical signal to be transmitted through the second edge.

32. The method of claim 30, further comprising:
converting, through an intermediate regenerative node, the optical signals from the node into electrical signals;
regenerating, at the intermediate regenerative node based on the electrical signals, new optical signals; and
routing the new optical signals from the intermediate regenerative node to the third node;

wherein the intermediate regenerative node is positioned along the second edge between the node and the third node such that a difference between the first spectral efficiency and the second spectral efficiency decreases.

* * * * *